3,340,068
PROCESS FOR REDUCING BUTTERFLYING IN
DEHYDRATED LEGUMES
John J. Mancuso, Astoria, N.Y., assignor to General
Foods Corporation, White Plains, N.Y., a corporation
of Delaware
No Drawing. Filed Aug. 20, 1964, Ser. No. 391,016
9 Claims. (Cl. 99—98)

ABSTRACT OF THE DISCLOSURE

Butterflying in dehydrated cooked legumes is greatly reduced by contacting the cooked legumes with a water-soluble organic hydrophilic agent selected from the group consisting of alcohols and ketones, thereby dehydrating the legumes, removing the extracted water and drying the legumes.

---

The present invention relates to legumes and to a new and improved method for producing legumes.

Generally, in preparing precooked instantized legumes, the legumes are soaked to increase their moisture content, cooked to eating texture, cooled, and dried directly under high humidity conditions which are gradually lowered to yield a final dry product ready for instant use, or the cooked legumes are frozen and then dried at some intermediate temperature under ambient moisture conditions. Dried instantized legumes prepared in this manner are subject to a serious drawback in that the skins which dry rapidly and contract are ruptured by the interior of the beans which dries at a slower rate. This rupturing results in "butterflying," that is, a separation of the skin from the cotyledon.

It is, therefore, an object of the present invention to provide a method for preparing precooked, instantized legumes which overcomes the "butterflying" effect. Another object is to provide an improved method for preparing legumes which are to be consumed in instant form. Another object is to provide a precooked, dried legume which will not have the undesirable appearance caused by "butterflying." These and other objects of the present invention will become apparent as the description proceeds.

It has now been found that "butterflying" can be prevented by removing moisture from the cooked legume in a dehydrating medium.

The method of the present invention is applicable to legumes in general and is particularly useful for beans, e.g., navy beans, pinto beans, red kidney beans, dark red kidney beans and red beans. The word legumes, as it is used in the present discussion, means the seeds of a leguminous plant. The casing or pod in which the seeds are found is not part of the legume as the term is used herein. After being cooked, the legumes are quenched, thoroughly soaked in cool water, drained and placed in a dehydrating medium. The dehydrating medium may consist of an organic dehydrating agent selected from the group consisting of water-soluble alcohol and ketones, e.g., methanol, ethanol, isopropyl alcohol, tertiary butyl alcohol and acetone, or mixtures thereof. The minimum amount of dehydrating agent employed is that amount which permits equilibration to take place between the moisture being extracted from the beans and the alcohol replacing the moisture. This amount is assured if the dehydrating agent is present in a quantity sufficient to completely immerse the beans. As the dehydrating agent becomes diluted with water, its efficiency diminishes. Accordingly, it may be desirable to use a large excess of dehydrating agent to overcome the decrease in efficiency due to dilution. On the other hand, smaller volumes of dehydrating agent may be used by employing two or more sequential treatments with dehydrating agent. A preferred dehydrating agent is 95% ethanol.

The length of time required for dehydration depends on the size of the legume and the ease of water extraction. In general, in the case of beans, small beans, such as navy and red beans, will dehydrate faster than beans such as kidney and pinto beans. The dehydration time can be shortened if the skins of the cooked beans are pierced. Generally, the extraction time will require a minimum of about one hour at ambient temperature. While the extraction may be carried on as long as desired, a point of diminishing returns is reached after a fairly short dehydration time and there is no marked advantage in prolonged dehydration times. The present invention may be carried out at ambient temperatures or at elevated temperatures, in which case shorter times will generally be required. The process of the present invention may be carried out batch-wise or continuously.

The following example illustrates the present invention without, however, limiting the same thereto.

Raw navy beans were soaked in tap water and held at room temperature for about 16 hours. The beans were then drained, placed on screens and autoclaved at 15 p.s.i.g. for 25 minutes. They were then quenched in cool water (50–60° F.) for 30 minutes. Two pounds of the quenched beans were thoroughly drained and placed in an excess of 95% ethyl alcohol. After one hour, the alcohol was drained off and the beans were placed in an excess of a fresh quantity of 95% ethyl alcohol. After 30 minutes, the beans were drained of the second quantity of alcohol, placed on screens to permit residual alcohol to evaporate and then subjected to mild drying at about 140° F. for one hour. The final dried beans exhibited a marked reduction in "butterflying."

When placed in boiling water, the dried beans rehydrated in about five minutes. The rehydrated beans were similar in appearance and texture to beans prepared by the lengthy soaking and cooking time required to prepare raw beans and were almost completely free of "butterflying."

The technique described above with reference to navy beans was repeated using pinto beans. Due to the larger size of the pinto beans, the skins of the cooked beans were pierced to facilitate dehydration. The reduction in "butterflying" was even more evident than with the navy beans.

The legumes prepared according to the present invention have superior appearance, thereby making for greater consumer acceptance. The elimination or marked reduction of the "butterflying" effect produces an instant bean which is closer to unprocessed beans, both in the dry state and in the rehydrated cooked state.

Generally, beans require an overnight soaking by the housewife before being blended with other ingredients during a cooking period which may be as long as several hours. Overall time for the housewife to prepare beans is significantly less according to the present process. Instant beans prepared according to the present invention can be used to prepare quick bean dishes by blending them with dry sauce ingredients and rehydrating both at the same time in 10 minutes or less. They may also be added to prepared sauces, canned soups, etc., for a variety of dishes.

As various modifications and changes in the foregoing invention will be apparent to those skilled in the art, the invention is to be limited only in accordance with the following claims.

What I claim is:

1. A process for reducing butterflying in beans comprising
   cooking the beans,
   cooling the cooked beans,
   contacting the cooked beans with a dehydrating agent selected from the group consisting of water-soluble alcohol and ketones,
   removing the liquid phase containing extracted water, and
   drying the beans.

2. A process according to claim 1 wherein the beans are soaked before benig cooked.

3. A process according to claim 1 wherein the beans are selected from the group consisting of navy beans, pinto beans, red kidney beans, dark red kidney beans and red beans.

4. A process according to claim 1 wherein the beans are cooled by quenching in cool water.

5. A process according to claim 1 wherein the beans are thoroughly drained before being contacted with a dehydrating agent.

6. A process for reducing butterflying in beans selected from the group consisting of navy beans, pinto beans, red kidney beans, dark red kidney beans and red beans which comprises
   soaking the raw beans,
   draining the beans,
   autoclaving the beans,
   contacting the beans with a dehydrating agent selected from the group consisting of methanol, ethanol, isopropyl alcohol, tertiary butyl alcohol and acetone,
   removing the liquid phase containing extracted water, and
   drying the beans.

7. A process according to claim 6 wherein the beans are contacted at least twice with said dehydrating agent.

8. A process according to claim 6 wherein the residual dehydrating agent is allowed to evaporate before drying the beans.

9. A process for reducing butterflying in legumes comprising
   contacting cooked legumes with an organic dehydrating agent selected from the group consisting of water-soluble alcohols and ketones,
   separating the extracted water from the legumes, and
   drying the legumes.

References Cited

UNITED STATES PATENTS

| | | | |
|---|---|---|---|
| 2,420,517 | 5/1947 | Brandner et al. | 99—204 X |
| 2,750,295 | 6/1956 | Treadway et al. | 99—204 X |
| 3,031,312 | 4/1962 | Morgan et al. | 99—204 |

A. LOUIS MONACELL, *Primary Examiner.*

RAYMOND N. JONES, *Examiner.*

S. E. HEYMAN, *Assistant Examiner.*